(12) United States Patent
Leslie

(10) Patent No.: US 10,149,989 B2
(45) Date of Patent: Dec. 11, 2018

(54) RETAINER ASSEMBLY HAVING A ROTATABLE, RELEASABLE SNAP BUTTON ENGAGEMENT

(71) Applicant: Henry E. Leslie, San Antonio, TX (US)

(72) Inventor: Henry E. Leslie, San Antonio, TX (US)

( * ) Notice: Subject to any disclaimer, the term of this patent is extended or adjusted under 35 U.S.C. 154(b) by 0 days.

(21) Appl. No.: 15/363,535

(22) Filed: Nov. 29, 2016

(65) Prior Publication Data

US 2017/0119106 A1    May 4, 2017

Related U.S. Application Data

(63) Continuation-in-part of application No. 14/445,791, filed on Jul. 29, 2014, now Pat. No. 9,700,125.

(Continued)

(51) Int. Cl.

| | |
|---|---|
| *A01K 27/00* | (2006.01) |
| *A44B 17/00* | (2006.01) |
| *A41B 9/00* | (2006.01) |
| *A41D 13/04* | (2006.01) |
| *A45F 5/00* | (2006.01) |

(Continued)

(52) U.S. Cl.
CPC .............. *A62B 9/04* (2013.01); *A01K 27/005* (2013.01); *A41B 9/007* (2013.01); *A41D 13/04* (2013.01); *A45F 3/14* (2013.01); *A45F 5/00* (2013.01); *A41B 9/008* (2013.01); *A44B 17/0041* (2013.01); *A45F 2003/142* (2013.01); *A45F 2005/006* (2013.01); *A62B 18/084* (2013.01); *Y10T 24/1374* (2015.01); *Y10T 24/47* (2015.01)

(58) Field of Classification Search
CPC .................................................... A01K 27/005
See application file for complete search history.

(56) References Cited

U.S. PATENT DOCUMENTS

| | | | | |
|---|---|---|---|---|
| 1,270,494 A | * | 6/1918 | Christiansen | ......... B60P 7/0823 24/302 |
| 2,612,139 A | | 9/1952 | Collins | |

(Continued)

*Primary Examiner* — Robert Sandy
*Assistant Examiner* — Michael S Lee
(74) *Attorney, Agent, or Firm* — Jackson Walker, LLP

(57) ABSTRACT

An assembly is disclosed, the assembly for providing release structure to a lanyard or strap adapted to be worn on the body, such as a neck strap. The release structure consists of a snap button assembly configured such that the release pull generated by tension in the strap is directed along an axis perpendicular to the closure and rotation plane of the male and female portion of the snap button assemblies. With structure to configure a release pull in such an axis, a safety feature is provided to the wearer such that tension in the strap, when it reaches a sufficient force to overcome the closure forces of the snap button assembly, will release the closed snap button and allow the strap to fall away from the body. Also, as in the case of a firefighter wearing an SCBA fire mask, it prevents the firefighter from being entangled or tethered if the strap were to get accidentally hooked or caught on something. The breakaway will allow the firefighter to continue using the mask with no interruption of breathing air from the mask. In lanyards and tool holders, those fall away from the body. In the case of a firefighter, the mask does not fall away from the body.

10 Claims, 30 Drawing Sheets

Related U.S. Application Data

(60) Provisional application No. 61/861,503, filed on Aug. 2, 2013.

(51) Int. Cl.
*A62B 9/04* (2006.01)
*A45F 3/14* (2006.01)
*A62B 18/08* (2006.01)

(56) References Cited

U.S. PATENT DOCUMENTS

| | | | | |
|---|---|---|---|---|
| 3,994,265 A | * | 11/1976 | Banks | A01K 27/005 119/865 |
| 4,044,725 A | * | 8/1977 | Miller | A01K 27/001 119/865 |
| 4,426,957 A | * | 1/1984 | Horrigan | A01K 27/005 119/865 |
| 5,373,815 A | * | 12/1994 | Sagebiel | A01K 27/005 119/654 |
| 5,450,820 A | * | 9/1995 | Kirsch | A01K 27/005 119/865 |
| 6,247,427 B1 | * | 6/2001 | DeBien | A01K 27/005 119/776 |
| 6,899,060 B1 | * | 5/2005 | Yen | A01K 27/005 119/863 |
| 7,107,941 B2 | * | 9/2006 | Wang | A01K 27/005 119/865 |
| D607,617 S | * | 1/2010 | Golenz | D30/152 |
| 9,179,647 B2 | * | 11/2015 | Lambert | A01K 27/001 |
| 2016/0073741 A1 | * | 3/2016 | Lambert | A01K 27/005 24/580.1 |

\* cited by examiner

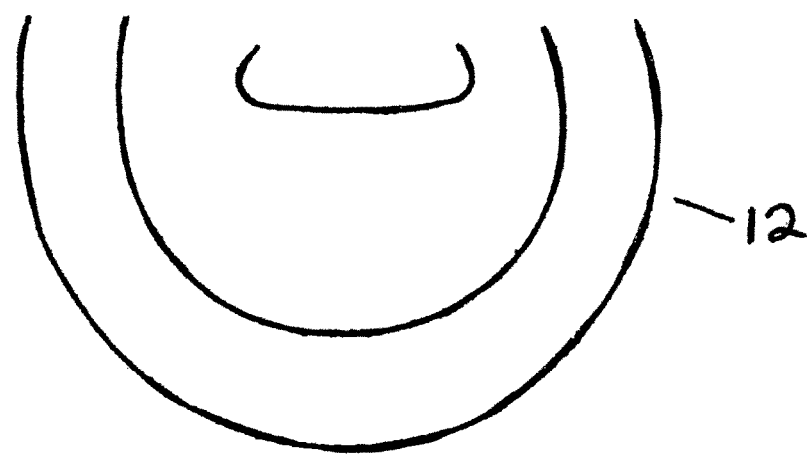
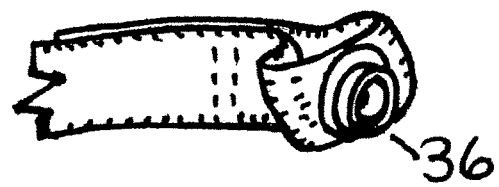
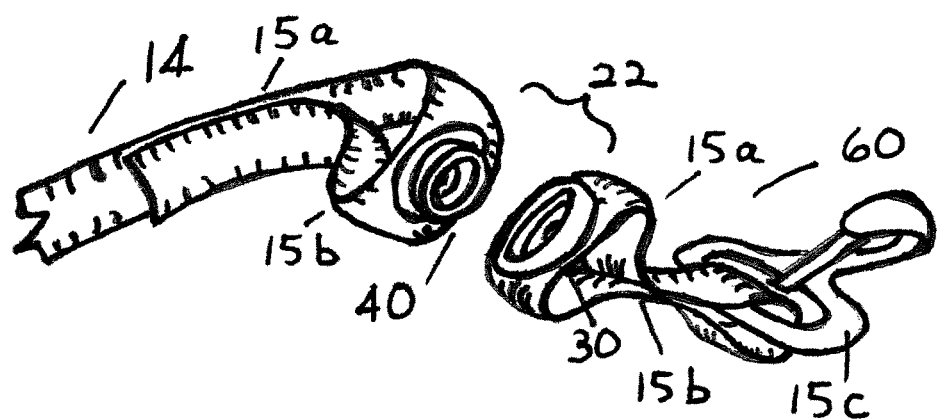
FIG. 2

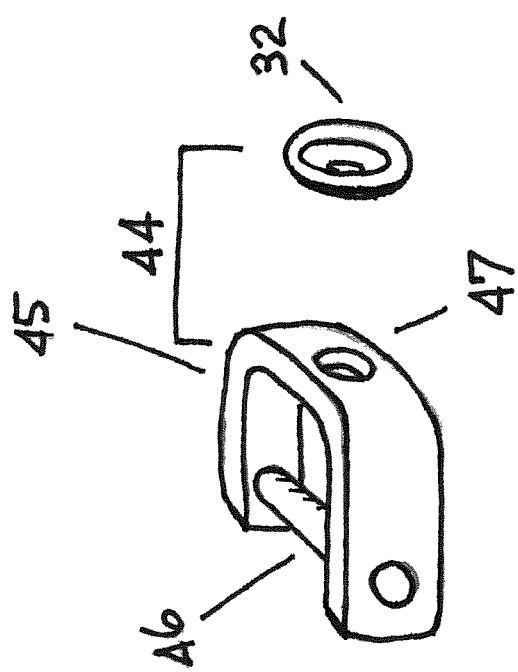

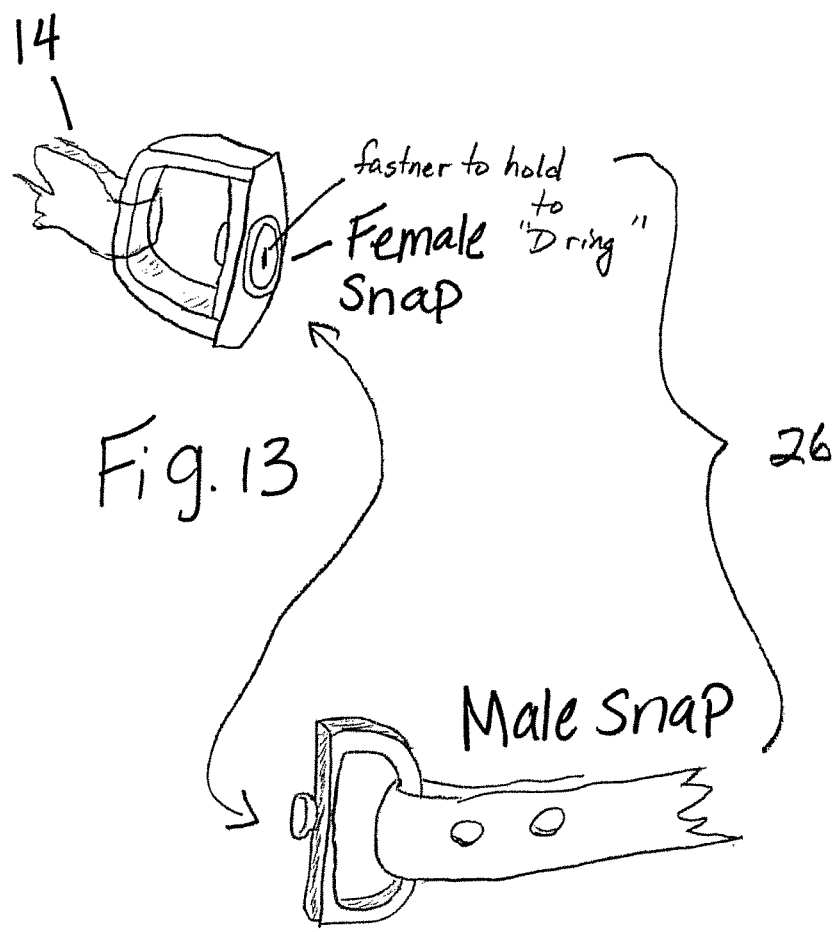

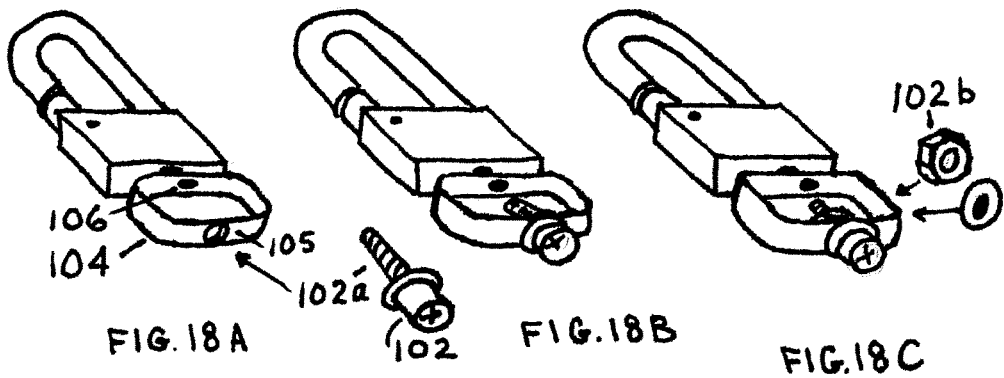
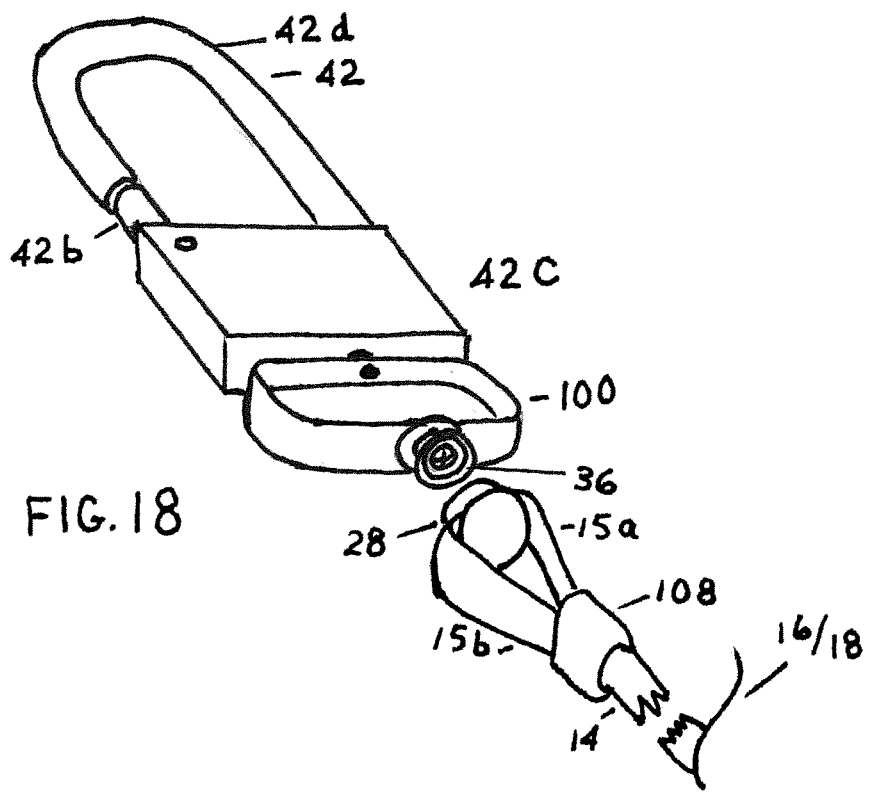

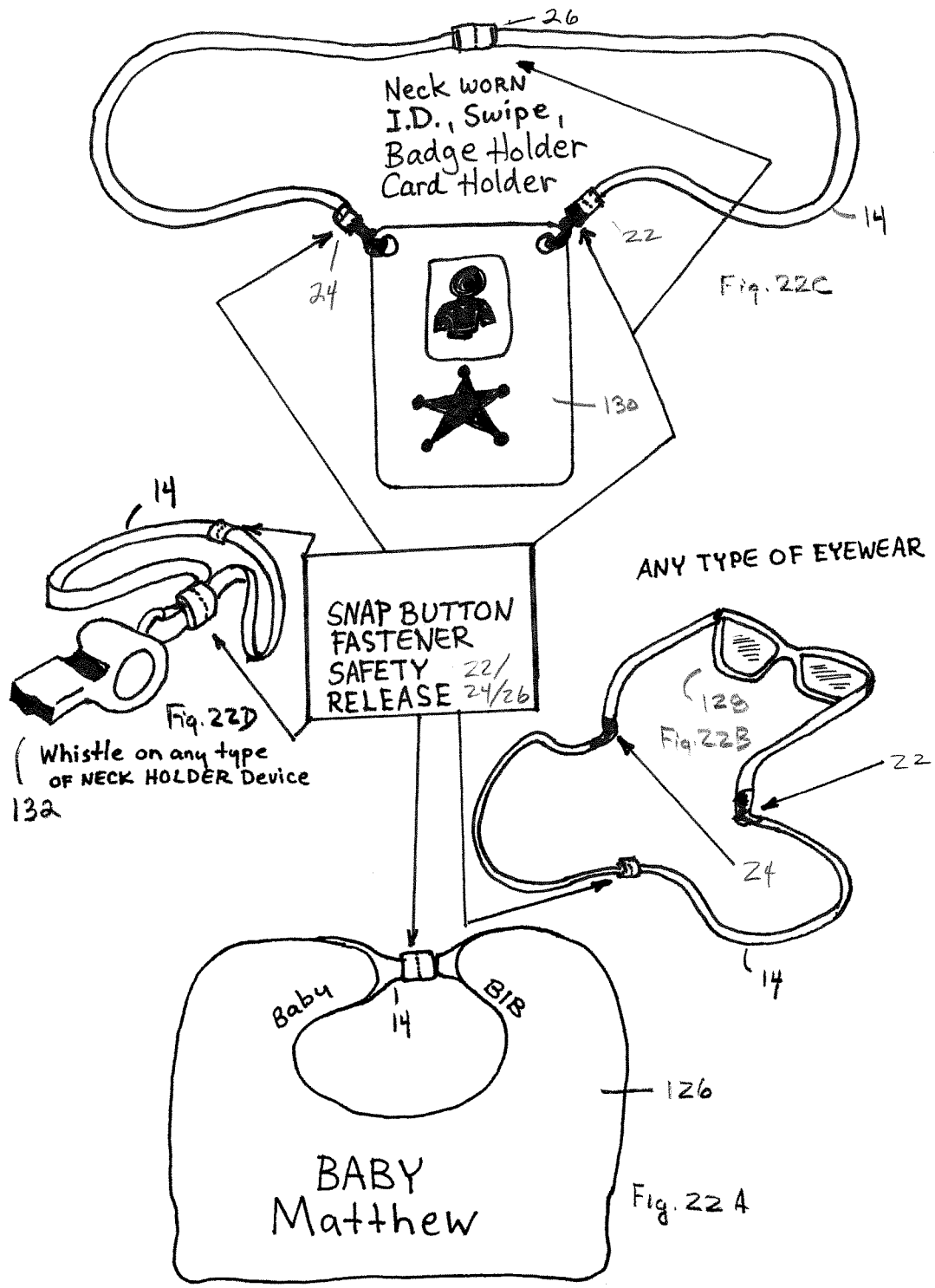

Pet Safety Release Collar
Snap Button Break Away

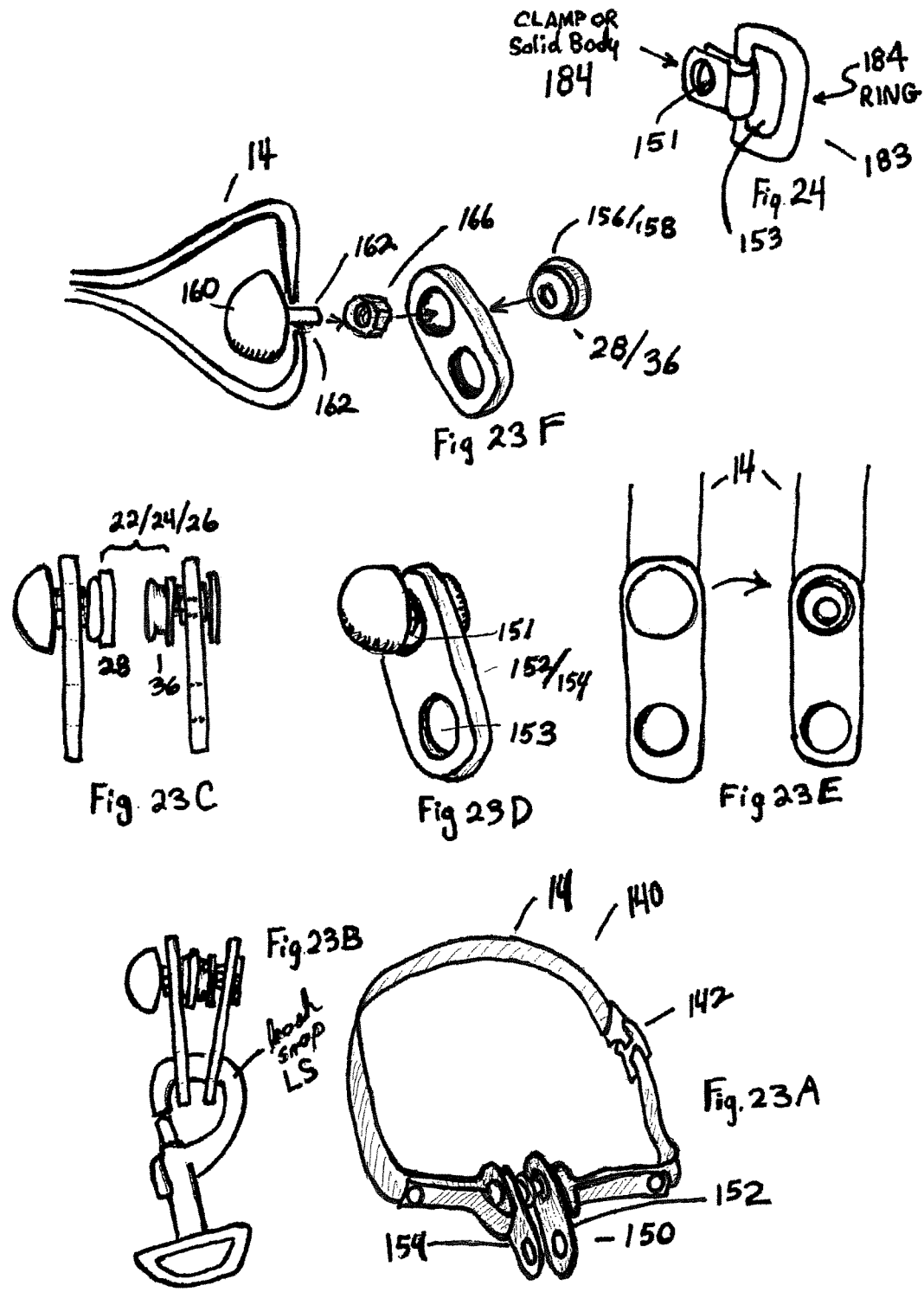

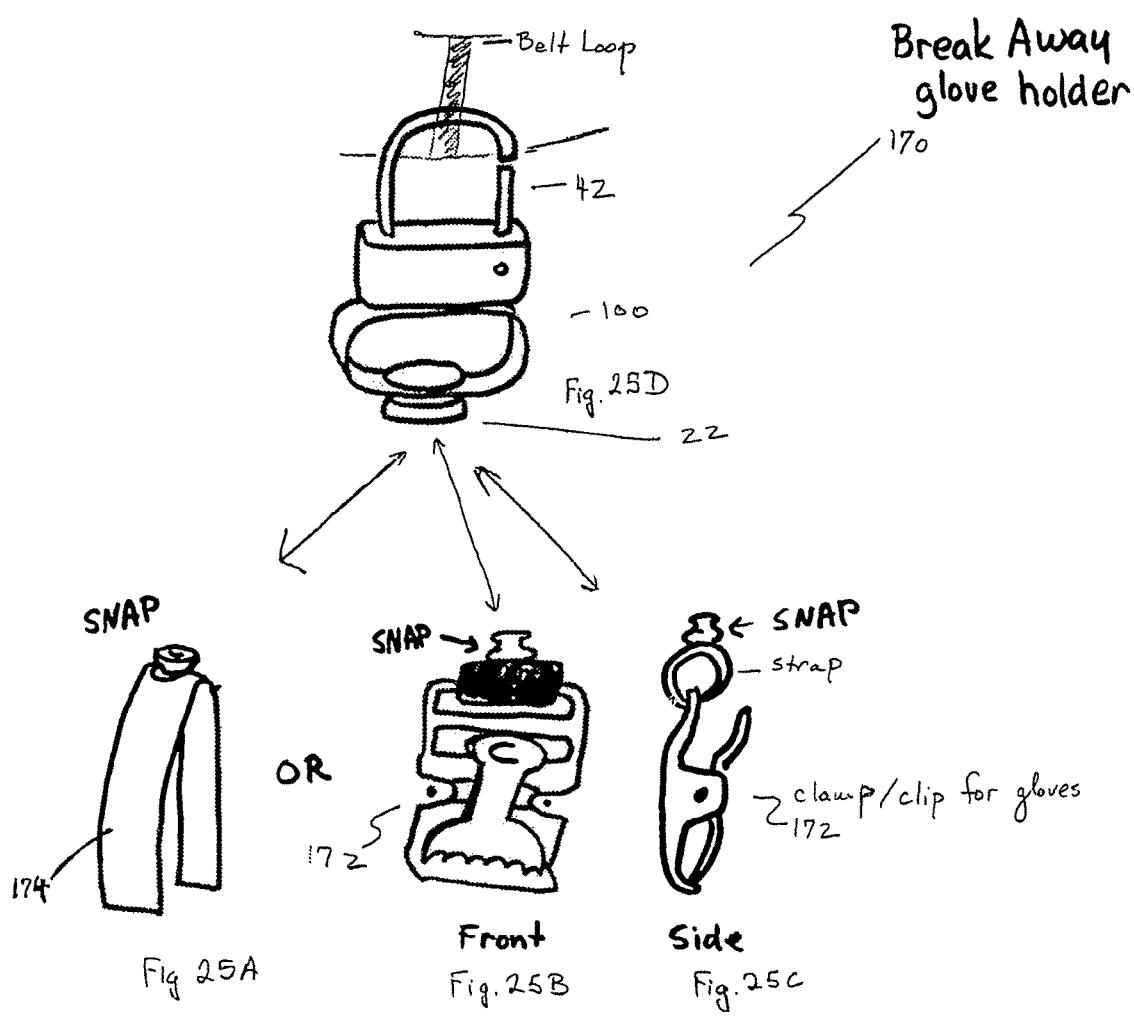

BIKINI Bottom, Thong Underwear, Intimate Bottom Wear
BIKER; Leather Bottom, Outter or Under wear Men or Women's Panty SNAP Button Breakaway
at least ONE Breakaway on each side or on front portion near crotch area

RETAINER ASSEMBLY HAVING A ROTATABLE, RELEASABLE SNAP BUTTON ENGAGEMENT

This continuation-in-part application claims the benefit of and incorporates herein by reference U.S. application Ser. No. 14/445,791, filed Jul. 29, 2014; which claims the benefit of and incorporates by reference U.S. Provisional Application Ser. No. 61/861,503 filed Aug. 2, 2013.

FIELD OF THE INVENTION

Retainer assemblies, including straps with separable elements for holding a workpiece.

BACKGROUND OF THE INVENTION

Neck straps are linear, flexible fabric elements adapted to be received around the neck of a wearer and for holding or retaining on the neck of the wearer, any number of various workpieces or items, including: firefighter's breathing air masks, eyeglasses, respirators, face gear, head gear, lanyards, and other suitable items.

Oft-times, straps or other retainer assemblies, such as article retaining straps, need to merely releasably engage the workpiece, such as by snap clips or threadable rings and loops. The retainment of a workpiece by a strap is often fairly straightforward. A strap or linear element may be passive, such as straps for connecting the removed end of eyeglasses when the eyeglasses are being worn, or they may be active (that is, supporting the weight of the workpiece), such as when the eyeglasses are removed and being actively maintained on the wearer by the strap.

There are cases, however, when either convenience or, more importantly, safety dictates a rapid, safe, easy release of one portion of a strap from another or the strap itself from a workpiece.

One such "quick release" scenario is played out in FIGS. 6A, 6B, 6C, and 6D. The inventor of the instant devices is a professional firefighter with several decades experience. He is seen here wearing a fire mask, which has a strap, including elements of embodiments of the invention as set forth herein. The firefighter merely needs to grasp a portion, if time permits, or just pull away with minimal force, the strap is designed to breakaway automatically with minimal force (linear pull) without the use of the firefighters' hands.

In the action sequence 6A-6D, a simulated event is shown, which depicts actual events that have occurred in emergency situations involving firefighters. Here, through a sequence of four photographs, a strap which engages the firefighter's mask and hangs loosely around the neck, is accidentally caught on a door handle. Imagine that the scene is smoky and visibility is low. With prior art snap clips or fastening elements, the firefighter ends up fumbling around trying to remove the strap that is caught on something (here, a door handle) while a fire rages around him. With an embodiment of Applicant's novel device set forth herein, the firefighter merely needs to grasp a portion of the neck strap and yank or just pull away forcing strap to break away.

When a firefighter's hands are busy holding equipment or tools or a rescued victim, there is no time to stop and pull on a caught strap. The Applicant's strap disengages itself ("hands free"—the firefighter does nothing) from the entanglement dilemma ("Life Safety"), because of the linear pull design. With as little as about 7 lbs. of pressure, the strap with snap buttons disengage with no damage to the expensive SCBA mask.

There are a number of other embodiments of Applicant's novel strap with snap button assembly. In some embodiments, a snap button or equivalent device is used to engage either the strap to a workpiece or one portion of the strap to another portion of the strap. Moreover, the snap button assembly used is configured on the strap or strap elements, such that the pull separation or force is substantially perpendicular to the plane of the closure elements of the snap. Thus, in embodiments of Applicant's strap and strap assembly, cooperating male and female elements of a snap button are affixed to a strap, which when pulled applies a force about an axis perpendicular to the face of the closure elements of the snap button or other snap. The breakaway snap button can also be located on any part of the neck strap for safety purposes.

SUMMARY OF THE INVENTION

A strap is typically provided with a first and second end, the first and second ends adapted to be releasably engaged to the workpiece, as by clips or other conventional elements. The strap includes at least one snap button assembly, the snap button assembly having a female portion and a male portion. The two snap button portions are releasably engageable and rotatable, in that they have closure elements which releasably engage one another and which lay when engaged in a closure plane. Strap portions of the strap may engage each of the snap button portions, such that applying tension to the strap aligns the strap portion with the axis of rotation of the closure plane.

The two snap buttons snap button assembly can also be a plastic snap button breakaway; KAM® buttons, and made of plastic where melting is not a concern. At a workplace, an I.D. lanyard or a swipe card can have a snap button assembly for breakaway at a location right above the I.D. or swipe card, and at another portion of the strap, preferably the center, for safety reasons. If the I.D. or swipe card gets caught on a piece of machinery or moving parts, the strap will breakaway at a safe amount of pressure. If the I.D. or swipe card was to get caught at a point where even the breakaway gets caught, a centrally located breakway (or at any other part of the lanyard), will offer (provide) yet another point (snap button assembly) of automatic safety release, preventing injury to the wearer.

It is very new, different, and useful in the fire industry, but can be used in many other industries where a neck, wrist strap or other connections are necessary or desired (work, sport, leisure, hobby).

An assembly for releasably retaining a workpiece to a person's body comprising a lanyard or strap having a first and a second end, the ends for engaging the workpiece, and a body portion between the two ends of the strap, a snap button assembly comprising a circular male portion and a circular female portion, the two portions lay in a common plane when releasably joined and are rotatable, one with respect to the other, about a common axis of rotation; and means for engaging the male portion and the female portion to the strap and/or the workpiece to translate tension in the strap to a separation force that is along the same axis as the axis of rotation (that is, perpendicular to the plane in which the two button portions connect). The means for engaging may comprise on one or both of the male and female portions, a pair of short strap sections forming a V-shape, with the mouth of the "V" spanning the male and/or female portion, and the apex of the "V" joining the strap or the workpiece. The means for engaging may be a D-ring with a curved portion and a straight member, the straight member attached to the female or the male portion, or each portion, of the snap button assembly.

The snap button assembly may engage a snap or spring clip for engaging the D-ring to the workpiece. The D-ring may further include a transverse bar for receiving a portion of the strap. The means for engaging may include a rigid U-shaped member; wherein the legs of the U-shaped member engage the body of the strap and the base engages one or both of the male/female portions; wherein the legs of the U-shaped member include a cross-bar therebetween for engagement with the strap; wherein the body of the strap has a width and wherein the length of the cross-bar is about equal to the width of the strap.

A clip, such as a snap clip, may engage either the male or female portions of the snap button assembly through a swivel assembly allowing the snap clip to swivel in addition to or even if the male or female portion does not rotate.

BRIEF DESCRIPTION OF THE DRAWINGS

FIG. 1 is a perspective illustration of an embodiment of Applicant's retainer assembly.

FIG. 2 is a perspective illustration showing a snap button assembly with the male and female portions detached from one another in a manner in which the flexible straps engage the snap button portion, so that the pull is linearly along the rotatable axis of the snap button.

FIGS. 9-17 illustrate additional embodiments of Applicant's snap button assemblies.

FIGS. 18, 18A, 18B, 18C, and 19 are perspective views of a snap assembly, the snap assembly including a swivel assembly.

FIGS. 21 and 21A illustrate views of Applicant's strap used in conjunction with a knife.

FIGS. 22A-22G illustrate additional workpieces for use with Applicant's novel retention device.

FIGS. 23A-23F illustrate various views of a post and plate assembly engaging the male and/or female portions of the snap button assembly.

FIGS. 24A and 24B are illustrations showing the use of the strap and snap button assembly with the post and plate assembly.

FIGS. 25A-25D illustrate the use of a snap button assembly as a glove holder.

DETAILED DESCRIPTION OF THE PREFERRED EMBODIMENTS

Figure 1A:
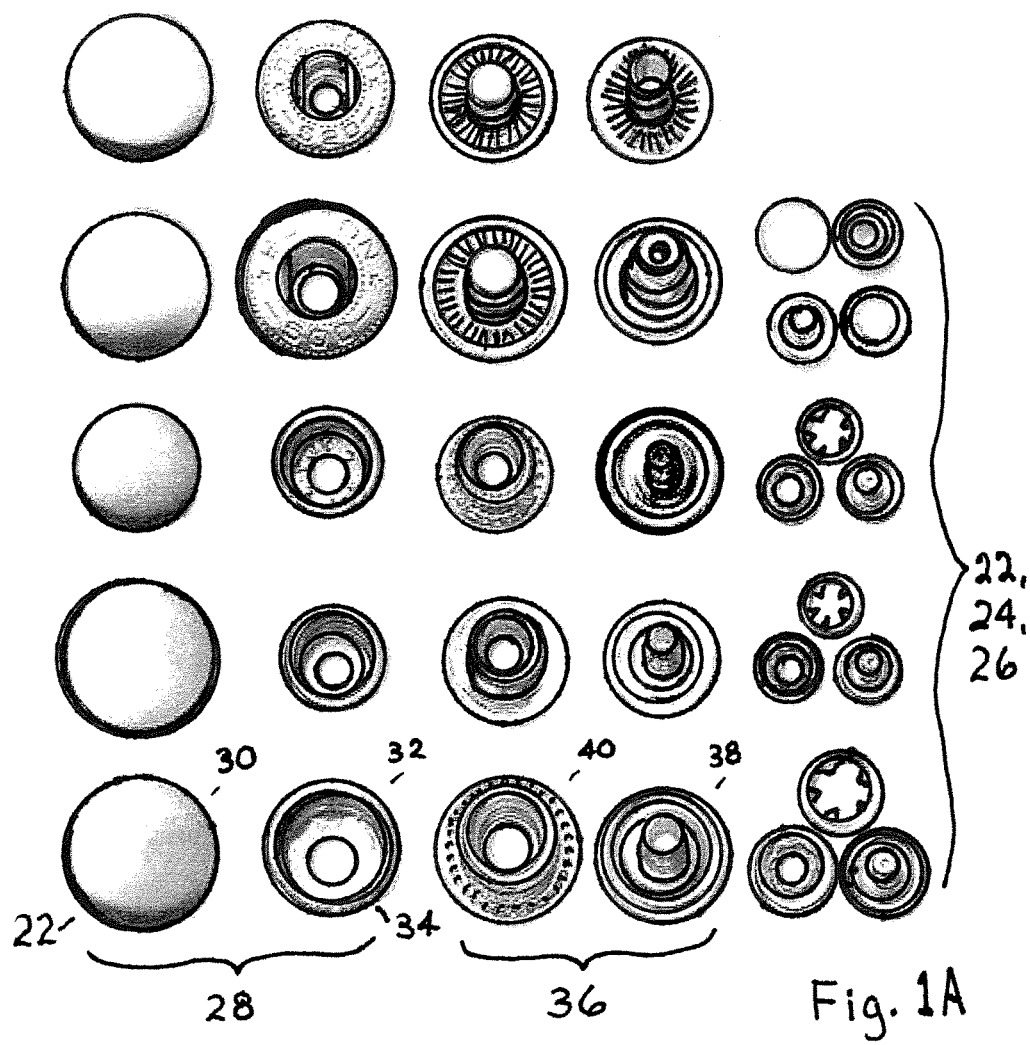
FIG. 1A is a perspective view of a multiplicity of different embodiments of releasable, rotatable snap buttons.
Figure 3:
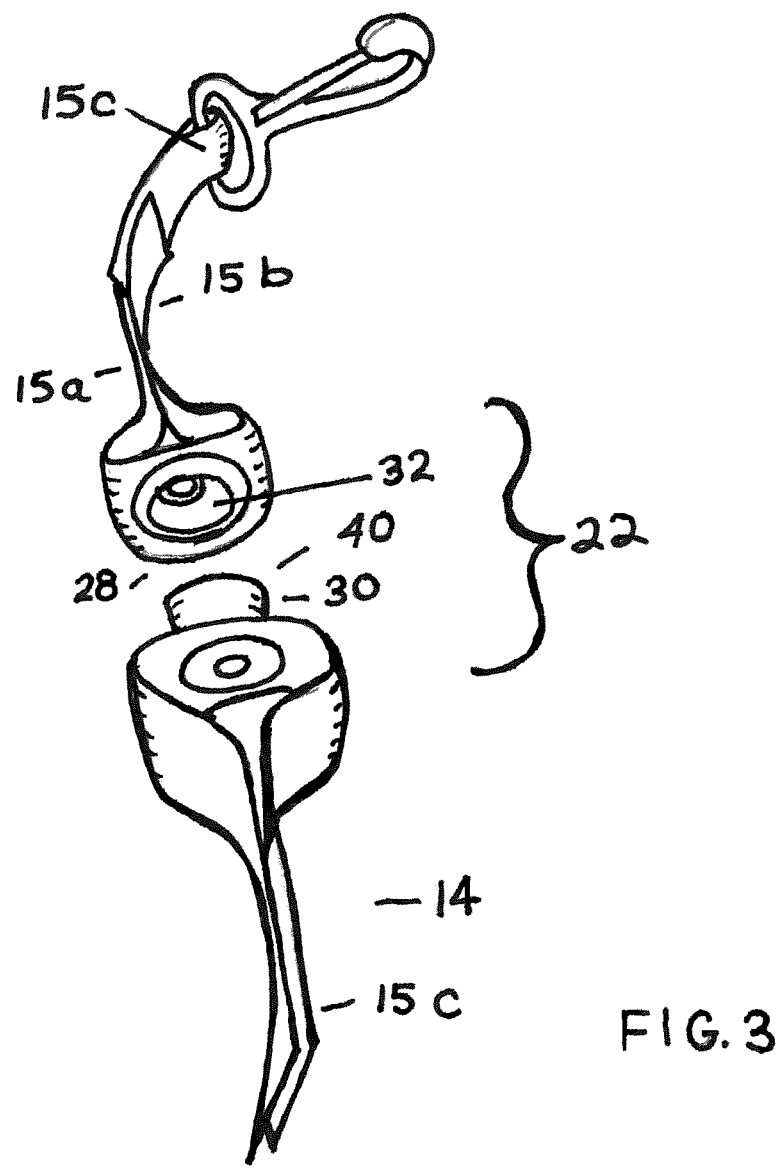
FIG. 3 is another perspective photographic view of the snap button assembly with the male and female portions separated.
Figure 4:
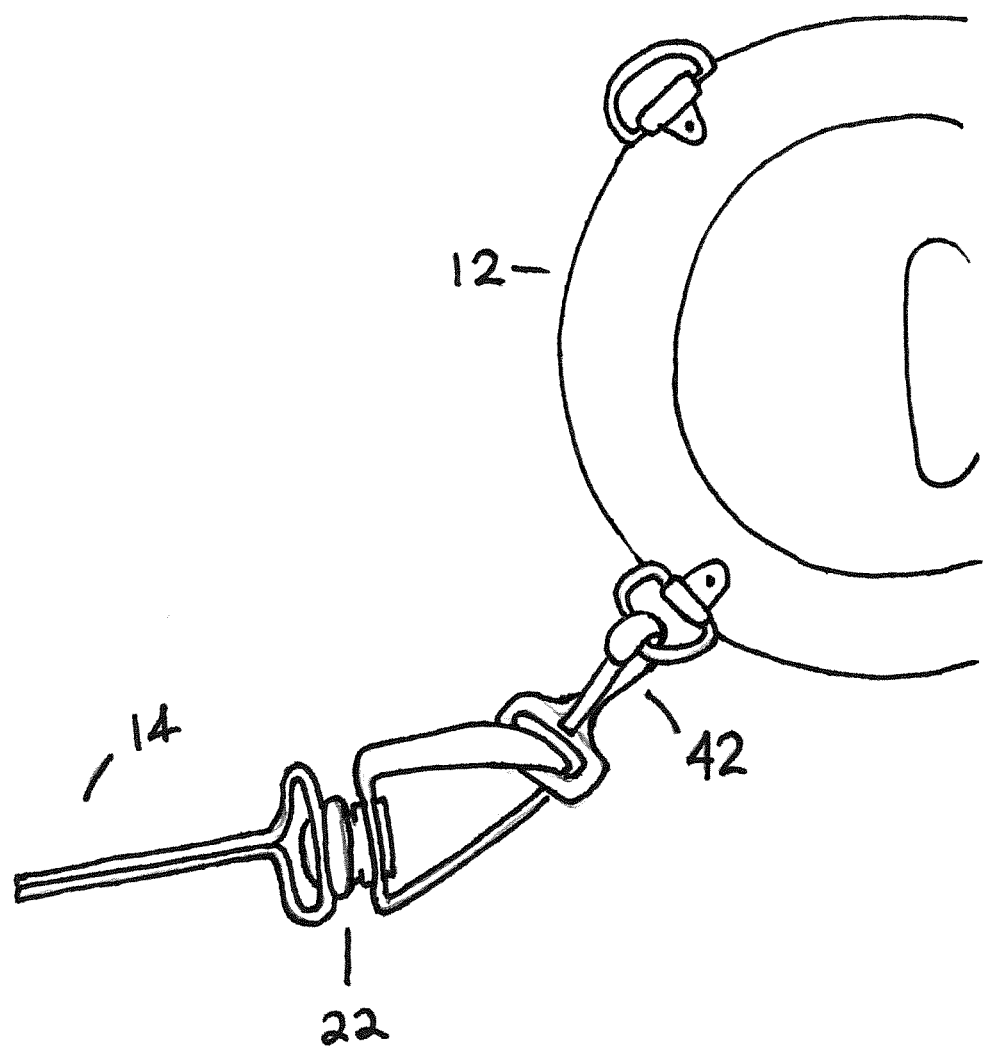
FIG. 4 is another perspective view of the snap button assembly in Applicant's embodiment showing the male and female portions of the snap button engaged to one another and showing the manner in which the straps attach to the snap button portions, so the pull separating the snap button is linear along the axis of rotation of the snap button assembly.
Figure 5:
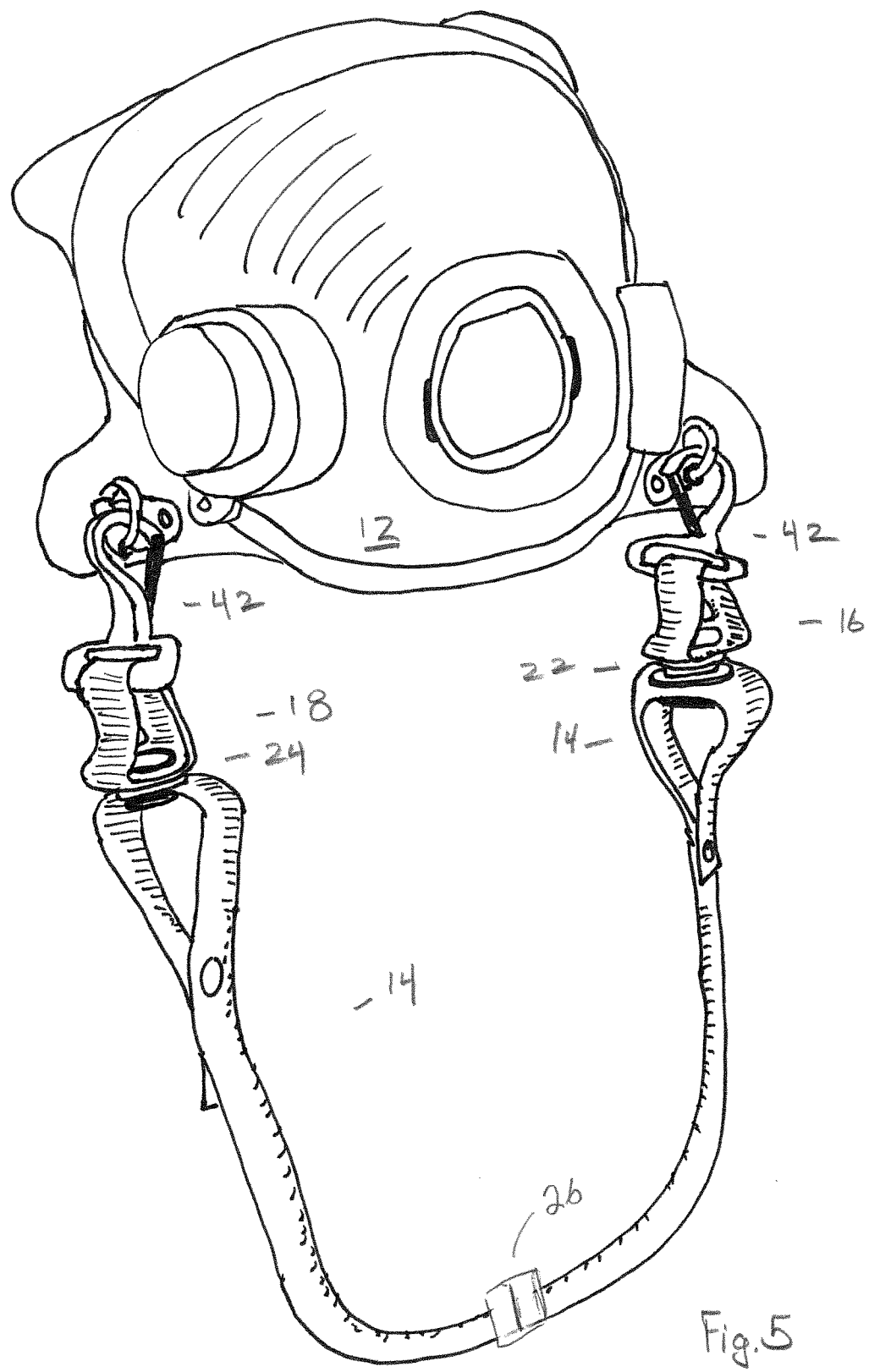
FIG. 5 shows a pair of snap button assemblies in perspective used to engage a strap to a workpiece, here, a firefighter's mask.
Figure 6A:
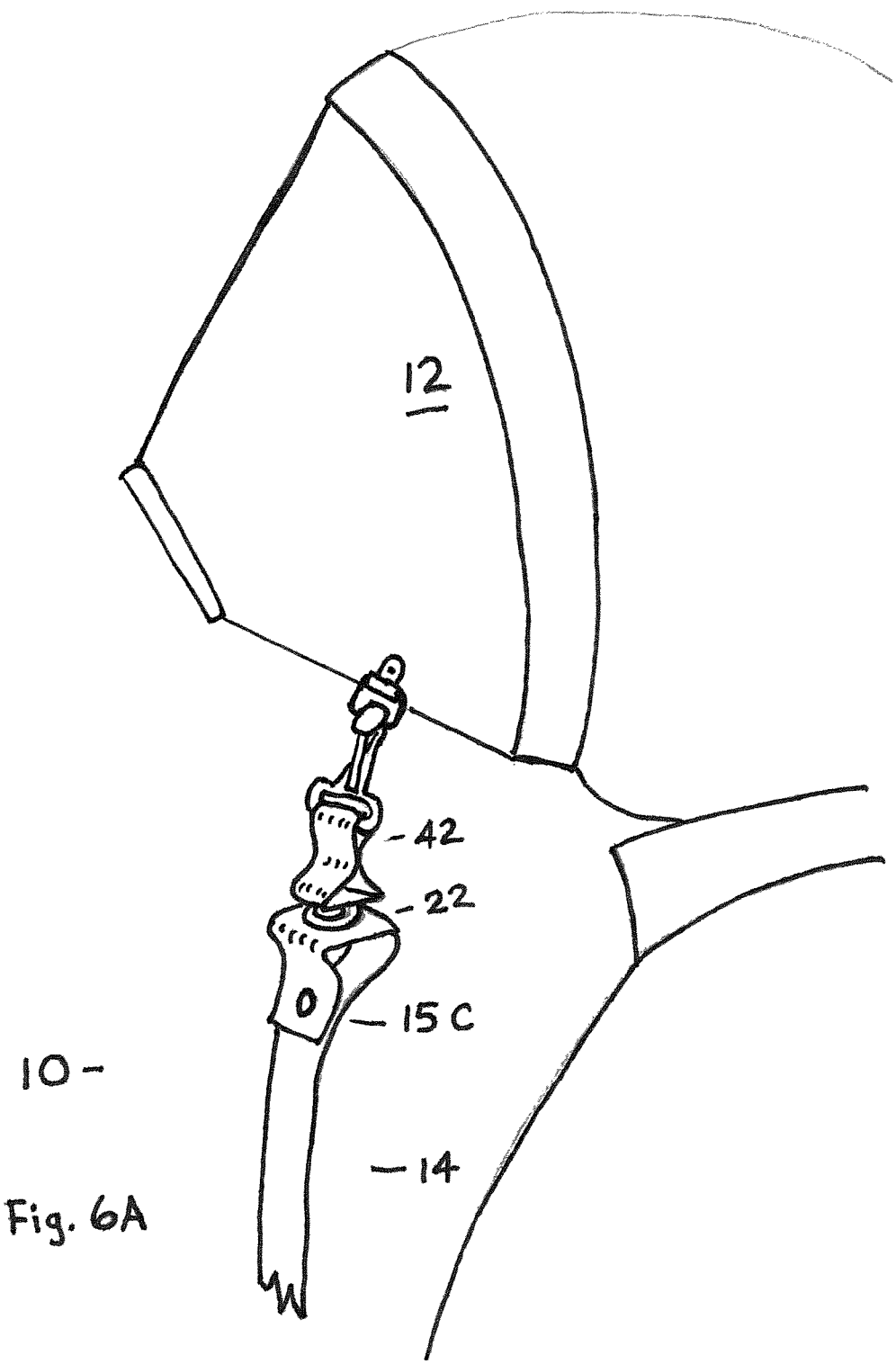
FIGS. 6A, 6B, 6C, and 6D are simulated action shots of a firefighter's mask as a workpiece and part of Applicant's retainer assembly using Applicant's novel snap assemblies.
Figure 6B:
Figure 6C:
Figure 6D:

FIGS. 1-5 illustrate some of the details of Applicant's preferred embodiments of a retainer assembly 10. It is noted that retainer assembly 10 typically comprises a neck strap 14, which may be a flexible linear element often made of a fabric, neck strap 14 having a first end 16 and a second end 18, and a body 20 therebetween. First end 16 or second end 18 are typically attached to a workpiece 12, which in the illustrations is a firefighter's SCBA air mask. However, workpiece 12 may include any element that typically carries a neck (or other strap that engages the body) strap 14, such as: lanyards in the workplace, eyeglasses, eye protection, face protection (face shield), tool holders, head gear, and head protection (helmet). First end 16 and second end 18 may be adapted, as with snap clips 42 or the like to attach, in one case removably, to elements, here, D-rings or clips of the workpiece. The snap clips 42 that are attached to the D-rings of the workpiece may also engage the fabric (strap material being of desired fabric/material for particular field/industry, e.g., the strap may be made of leather or fireproof Kevlar® in the firefighting industry) or other material of neck strap 14, either fixedly or adjustably.

Figure 17:
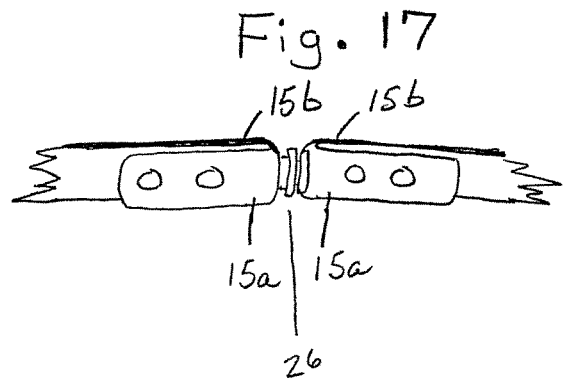

It is seen that near either end of neck strap 14 or any place along the body may be one or more rotatable release snap button assemblies, here, designated 22/24 (either end)/26 (in the body, see FIG. 17). In one embodiment (see FIGS. 2 and 5, for example), the snap button assemblies are found at or near either or both ends of neck strap 14, where the neck strap 14 is engaged to a workpiece. In another embodiment, one or more snap button assemblies are located anywhere along the linear elements of the body of neck strap 14. In another embodiment, an assembly is located near the center of the neck strap 14.

The Figures, including FIG. 1A, illustrate the various types of rotatable, release snap button assemblies that may be used in Applicant's neck strap 14 for releasably engaging one section of the strap or workpiece Wp with another in a manner that will allow the strap to be quickly and easily separated, and in a manner in which one portion of the strap and the other portion of the strap, which are engaged by a snap button assembly, may rotate one with respect to the other.

First, a look at the details of Applicant's snap button assemblies. There is seen to include a female portion 28, which typically has at least an outer surface 30, recessed portion 32, and resilient or spring-like elements 34 (which may be a cylindrical loop) for engagement with an extending rim 40 of male portion 36. In one embodiment, male portion 36 is seen also to include an outer surface 38. In typical snap button assemblies, outer surface 30 is press fit and configured into recessed portion 32 and outer surface 38 is press fit to extending rim 40 of male portion.

While Applicant's neck strap may indeed press the two joining elements over fabric so as to lock the fabric to both a female portion 28 and male portion 36, a difference in Applicant's application lies in which the neck strap and snap button assemblies are engaged to the workpiece or strap. It will be seen that when the closure elements (male extending rim 40 into female recess portion 32) are joined, they lay in a plane in which one can rotatably move with respect to the other about a common rotation axis. What Applicant does is provide means 60 to place a pull line along the neck straps (or workpiece and neck strap) of each of the male and female portions, such that they pull along the rotatable axis so as to provide a force normal to separate the male portion from the female portion. That is, the separation forces are adapted to align along the neck strap when it is pulled in a linear fashion in a manner that is perpendicular to the closure plane or the plane in which the two portions rotate, and along the axis of rotation with respect to the snaps. The axis of rotation is seen to be coming out of the page and into the page in FIG. 1A.

Figure 7:
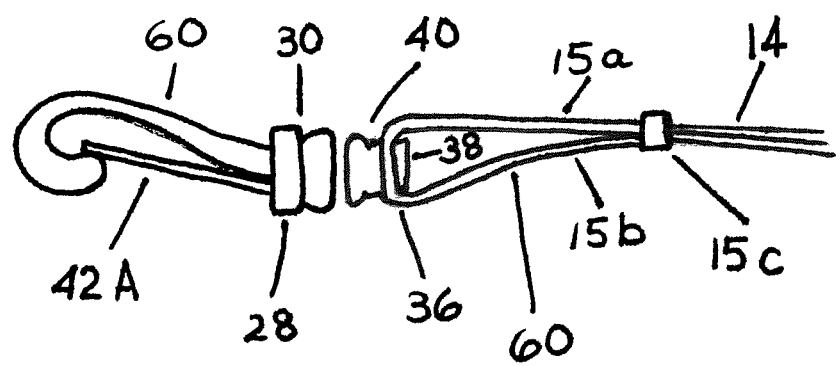
FIG. 7 is a perspective view of one embodiment of Applicant's novel snap button assembly.

As seen in FIGS. 2 and 7, two V-shaped sections of the strap 15a/15b extending out from the clamp portions are folded back and are engaged one to the neck strap 15c, so that each of the two extension portions are about equidistant from the male or female portion. This tends to settle releasing forces either along the axis of separation or around the circumference of the round elements of the two portions of the snap, so that they translate into separation forces perpendicular to the closure plane. This differs from the typical manner of application of separation force to snap buttons, which is to leverage them apart and pivot them on a torque moment about an axis along the rim.

The manner in which two portions of the neck strap may be folded about the two portions may be seen in FIG. 7, which shows portions 15a and 15b being attached at 15c to neck strap 14. The same may be done for the female portions in the earlier embodiments, for example, see FIG. 5. However, FIG. 7 shows something else, and that is the manner in which alternate embodiments of means 60 may be adapted with structure that achieves the aligned pull of separation of the earlier embodiments. For example, FIG. 7 shows that the female portion 28 is modified, so that extending substantially perpendicular to the plane therefrom, is a modified spring clip 42a, modified so that its longitudinal axis is adapted to be perpendicular to the engagement plane, that is, the plane in which the two elements may rotate one with respect to the other when they are engaged.

Figure 8:
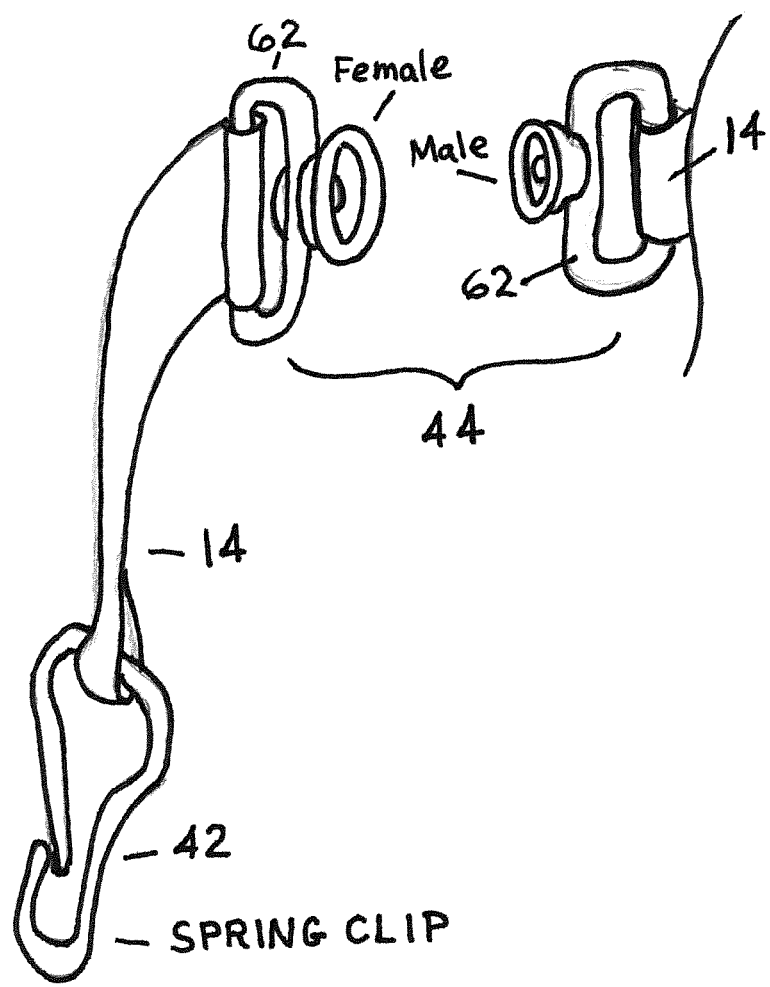
FIG. 8 is a perspective view of yet another embodiment of Applicant's snap button assembly.

FIG. 8 shows means 60 to be a snap button assembly having one or both of the male and female portions engaged to a D-ring or loop 62 configured to attach to the body of the neck strap or workpiece. It will be noted that you still have the axial pull and the rotatable functions, such that rotation is along the pull axis when the neck strap is drawn tight. Spring clip 42 is used in FIG. 8 to attach neck strap 14 to a workpiece.

Figure 8A:
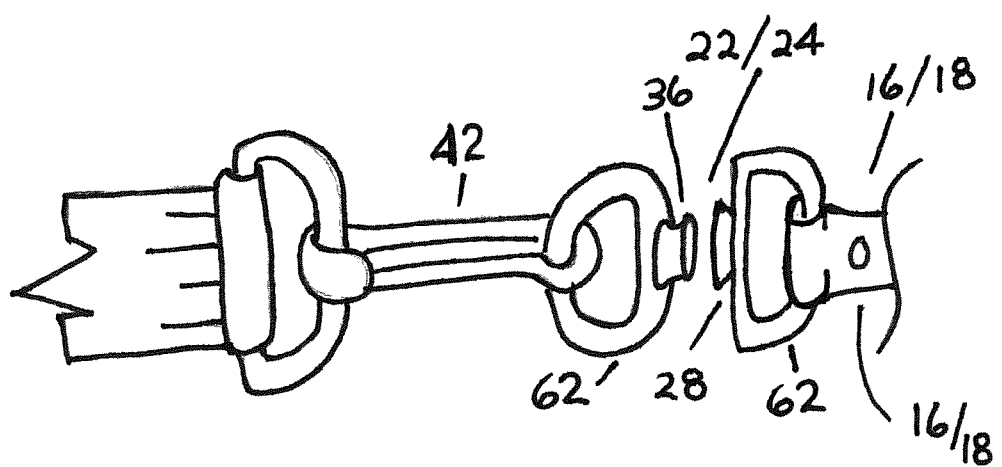
FIG. 8A is a perspective view of another embodiment of Applicant's snap assembly.
Figure 10:
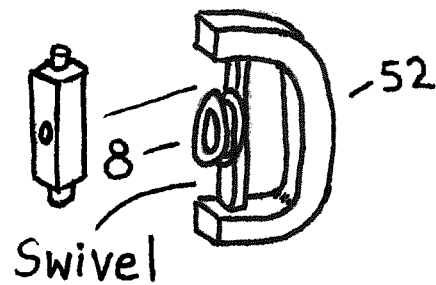
Figure 11:
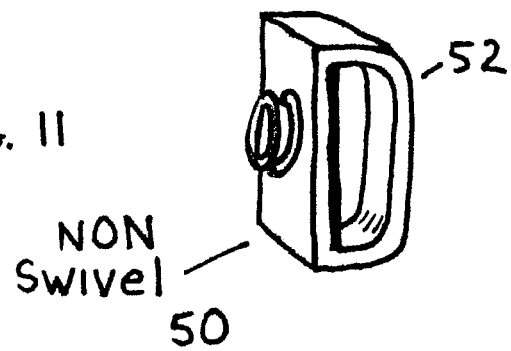

FIG. 8A shows snap button assemblies 22/24 engaged at one end to neck strap end 16/18 and at the other end with a spring clip 42 to the workpiece itself. In some embodiments, the snap buttons release at between about 5 and 9 pounds, in another about 7 pounds.

Figure 15:
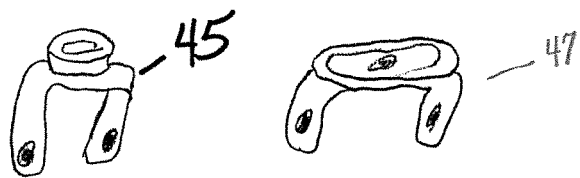
Figure 16:
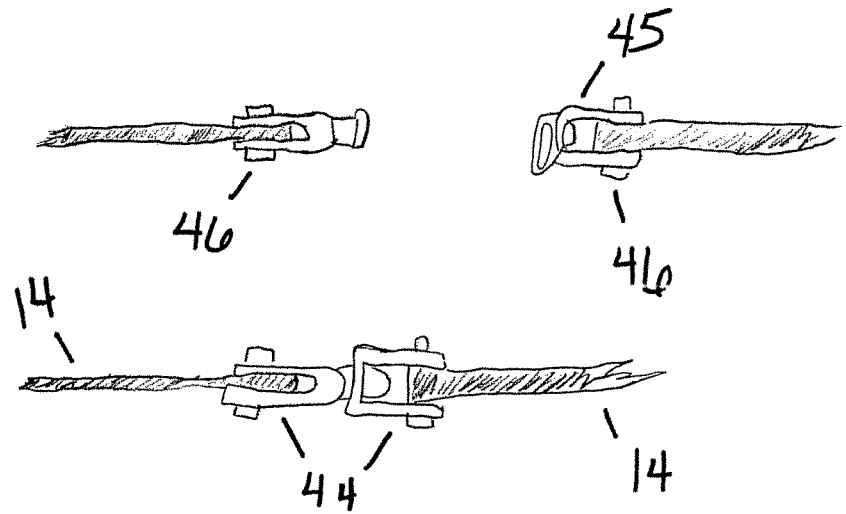
Figure 19:
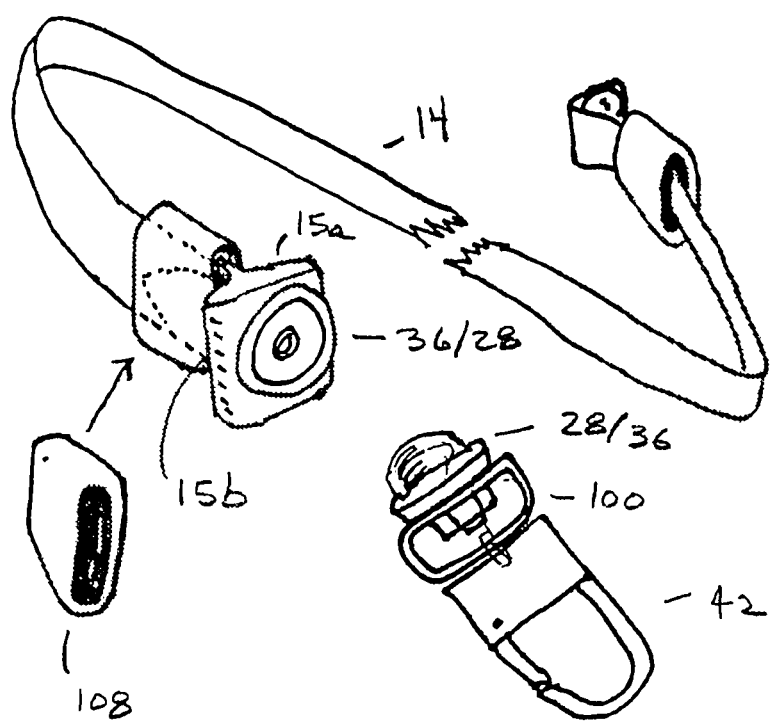

FIG. 9 illustrates another view of means 60, here the modified loops or rings of FIG. 8. In FIGS. 9, 15, and 16, a U-shaped member 47 is seen with a base 45 with arms extending generally either perpendicular outward or perpendicular and then back from the rotation plane, which arms may be adapted to receive an axle 46 around which the neck strap 14 may be engaged. FIG. 16 shows the manner in which tension in neck strap 14 will provide axial separation when the male and female portions are configured perpendicular thereto, such as in the pair of U-shaped members illustrated therein.

Figure 12:
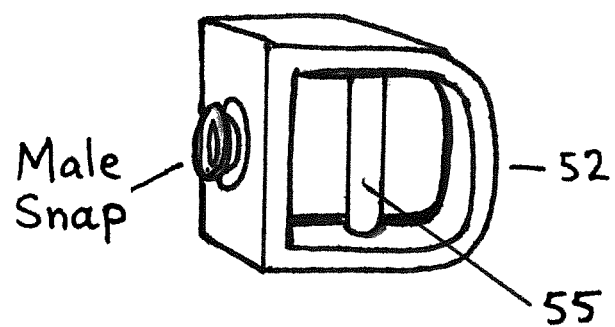

FIGS. 10, 11, 12, and 13 all illustrate a D-ring with a swivel 48 or non-swivel 50 straight member. Typically, the swivel 48 or non-swivel 50 arm may have separated and spaced apart therefrom, a cross-arm or transverse bar 52 that is adapted to receive a strap portion 14 as best seen in FIG. 13. FIG. 17 shows the snap button assembly with strap segments 15a/15b directly engaging the strap, as in some of the earlier embodiments, see FIGS. 1-5. FIG. 7 is a "hybrid" with fabric directly engaging the male portion and workpiece or neck piece attachment means on the female portion. FIGS. 8-16 are all embodiments that use intervening structure between the male or female portion and the strap portion or workpiece. In the other Figures showing intervening structure, swivel or non-swivel arms are used to mount the snap buttons thereto and then spaced back arms with cross-members for engaging the fabric strap are shown. FIG. 12 shows a neck strap adjustment bar 55, so that a strap may be configured around bar 55 and cross-member 52 to adjustably set the position of the strap engaging male portion illustrated in FIG. 12.

Applicant also discloses a kit for existing neck straps. A kit can be made to modify existing neck straps. The breakaway snap button feature can be attached to a mask, for example, and breakaway feature can be added to existing mask strap (correspondingly) to turn a non-breakaway strap (existing) into, now, a breakaway strap and is also part of this application disclosure. A kit may include snap assemblies and any of the means 60, such as loops, D-rings or U-shaped members, with or without snap clips.

Even though a neck strap is what is focused on, the breakaway snap button can be used in other instances where, for safety purposes, a linear snap button safety breakaway assembly would work, be desired or preferred to prevent injury, for instance. on a baby bib to prevent choking or hanging, or a preventable injury. A linear pull safety breakaway using baby sized snap buttons is preferred or appropriate sized snap buttons. For an apron with a neck strap in the workplace, a linear pull safety breakaway would be preferred. The focus is: safety, a true linear pull safety breakaway using snap buttons which allow rotatability and releasability for safety.

Other embodiments are anticipated, including apparel, clothing, baby bib or on a full workplace apron which has a releasable neck strap like a chef cooking apron or any other type of apron in the workplace that has a neck strap portion.

Figure 20:
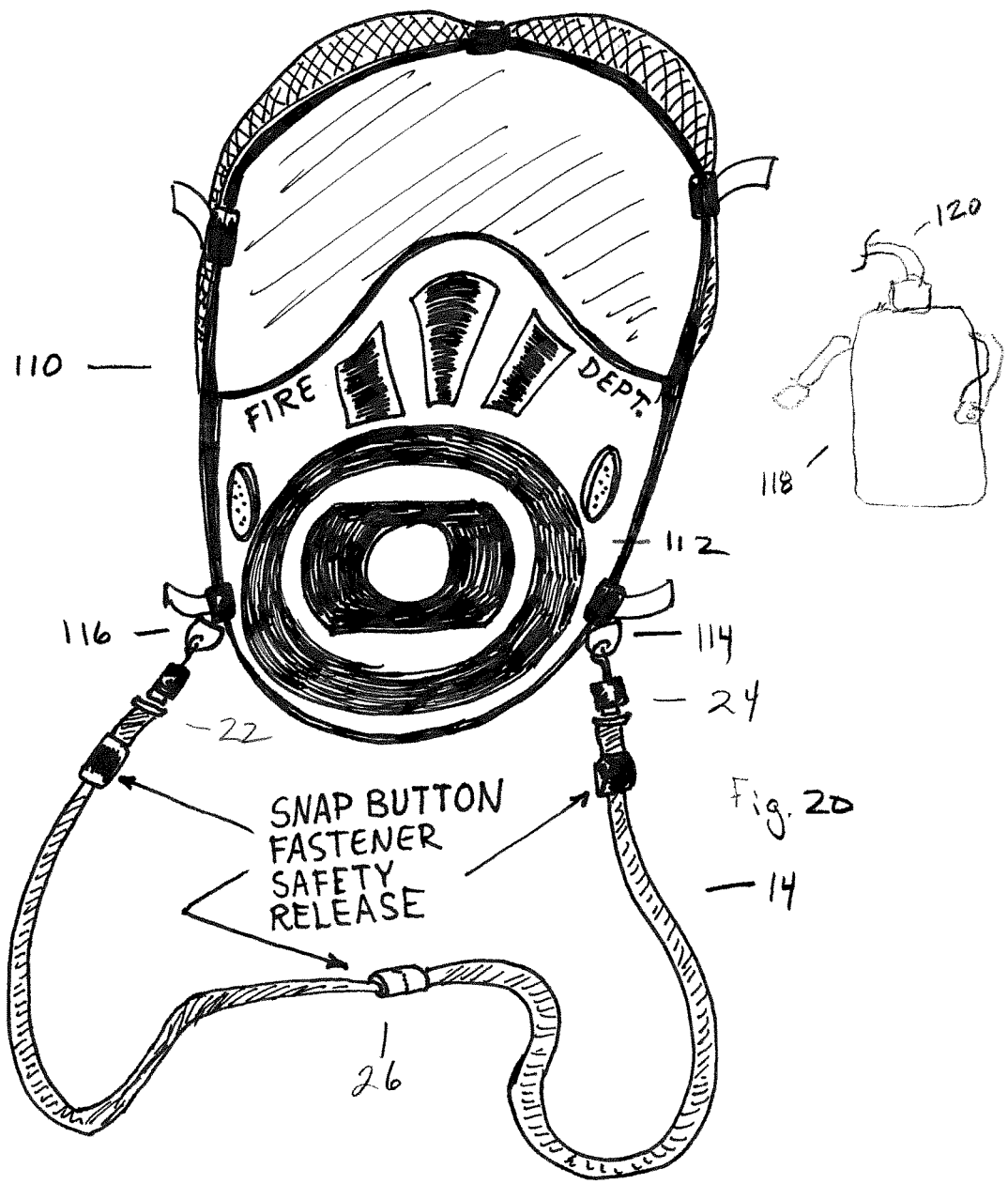
FIG. 20 illustrates an SCBA firefighter face piece in front view.

FIGS. 18, 18A, 18B, 18C, and 19 are views of a strap fabric body for engagement to a number of workpieces, in one embodiment, an SCBA (see FIG. 20). The strap incorporates one or more snap button assemblies 22/24/26 that may be part of the strap, by being affixed to either end and part of the end of the strap or being part of a body portion of the strap (connecting two strap portions). In any case, the embodiments in these figures illustrate a novel swivel assembly 100 (which may be used in conjunction with snap clip 42), which swivel assembly functionally allows the rotation or swiveling or pivoting along the axis through which the button assemblies may rotate, but wherein such swiveling or pivoting may allow snap clip 42 to rotate or pivot separately and apart from rotation of the male portion with respect to the female portion. In other words, if for some reason the male and female portion could not rotate pivot one with respect to the other, they could still be pivoting at the junction of clip 42 to loop 104 of the swivel assembly 100. Swivel assembly 100 may have loop 104, a fastener 102, which may include a nut 102b (or screw head) and a shaft 102a to fasten one portion of the loop to either the male or the female portion of the snap assembly. In FIG. 18, it is seen that male portion 36 uses fastener 102 to engage to loop 104. Then female portion 28 will attach to the male portion. A ferrule 108 may be swedged or clamped to hold strap portions 15a/15b to strap 14 in the manner set forth hereinabove (see FIG. 7, for example).

A pivot or swivel pin 106 opposite fastener 102 may attach loop 104 to snap clip 42 as set forth in FIGS. 18A, 18B, and 18C. It is seen that a hole 105 for receiving fastener 102 in a portion of loop 104 is about 180° opposite the location of pivot pin or swivel pin 106 contact with snap clip 42. Swivel pin 106 is loosely engaged to body 42c of clip 42 so it can allow relative pivoting between the two. Snap clip 42 may have a clasp portion 42d, which has a spring loaded leg 42b for engagement to a D-ring or any other attachment means on the workpiece. Body 42c is provided so that a pin may be at one end thereof and the clasp at the other. Thus, strap ends 16/18 may include a snap button assembly, the snap button assembly having a swivel assembly and spring clip engaged therewith, the swivel assembly for engaging a snap clip and allowing the snap clip to rotate with respect to the fabric body of the strap. The ability to swivel at a number of points (here, the loop as well as the snap buttons) is an added safety feature to the strap allowing a safety release of the strap from the mask or the release of a portion of the strap.

FIG. 20 illustrates the use of SCBA firefighter face piece 110, the face piece having a body 112 configured to at least partly cover the nose and mouth of the wearer. Body 112 typically has some form of lanyard or strap attachment device 114/116, here illustrated as rings or hooks. Applicant's lanyard or strap, including a safety release, snap button assembly will be engaged with the attachment devices 114/116. There should be at least one snap button assembly 22/24/26, and sometimes two or three. Here, three are illustrated, the strap having one at each end 22/24 where it attaches to the SCBA mask, and one 26 in the body of the strap. An air bottle 118 and an air hose 120 may be engaged to the SCBA firefighter face piece 110, the three together comprising a breathing device to engage the firefighter when he goes into a fire. SCBA firefighter face pieces and bottles and air hoses are known in the art.

Figure 21:
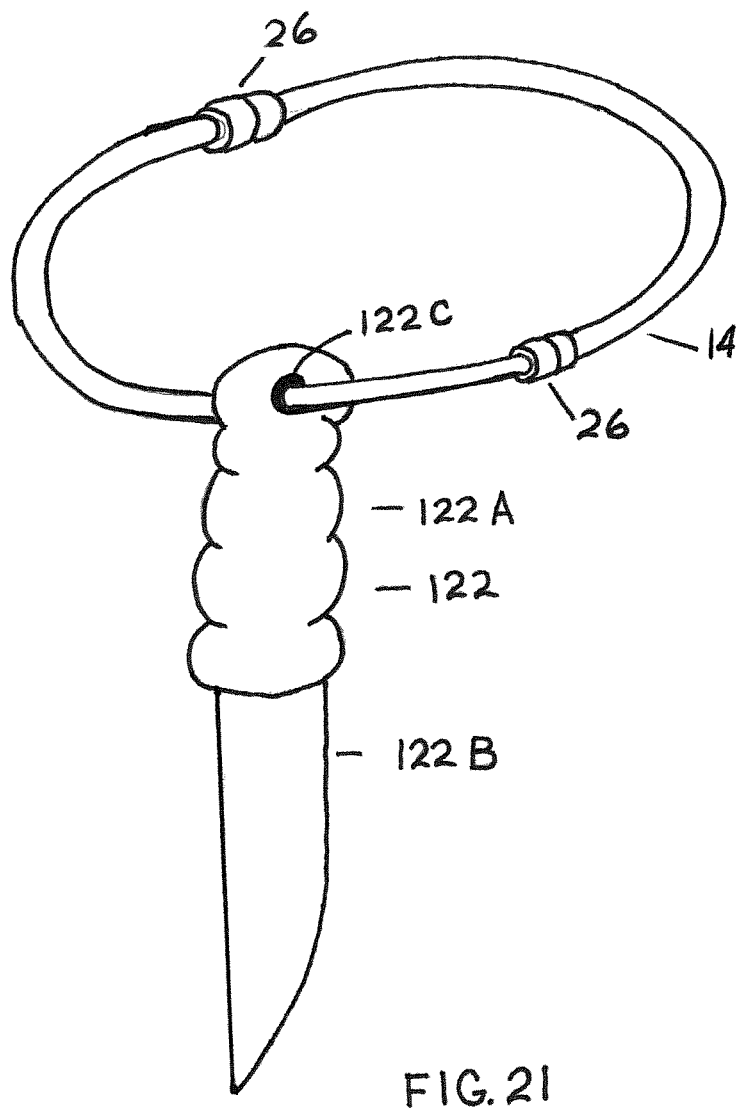
Figure 21:
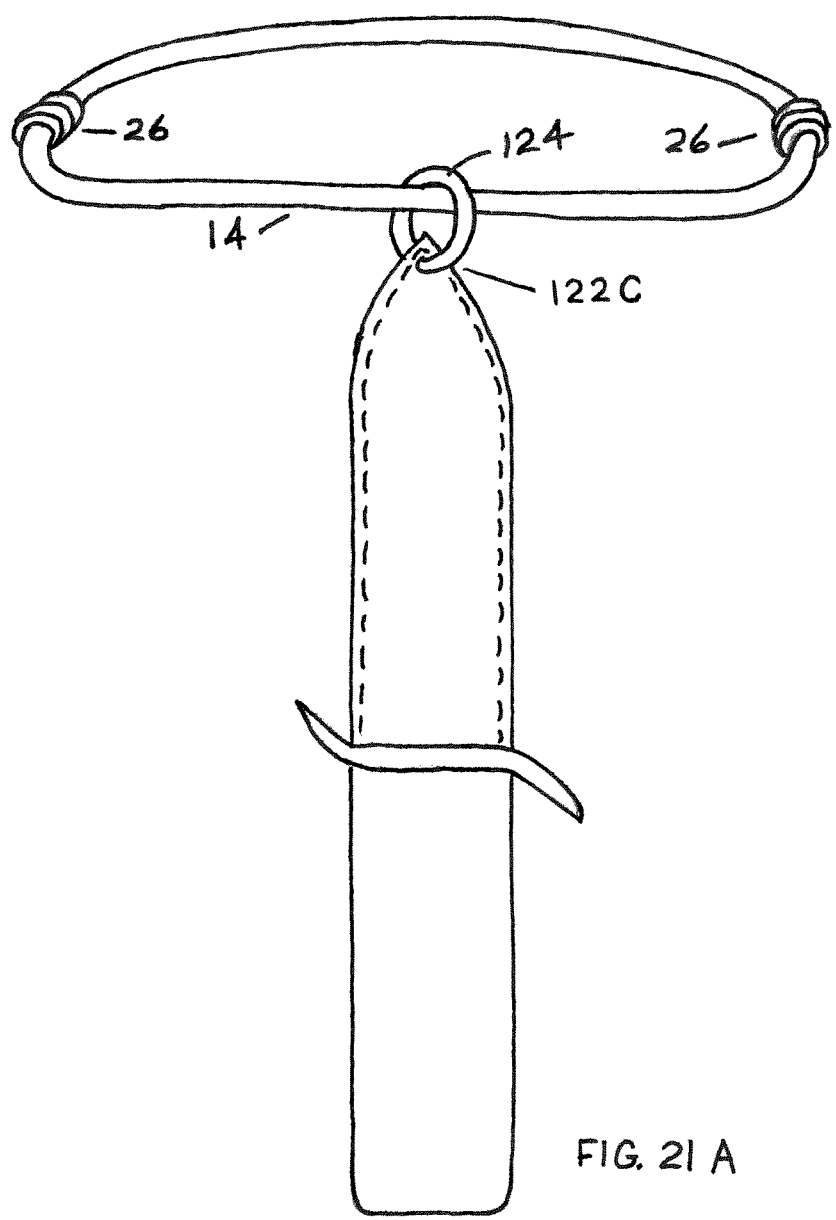
Figure 22E:
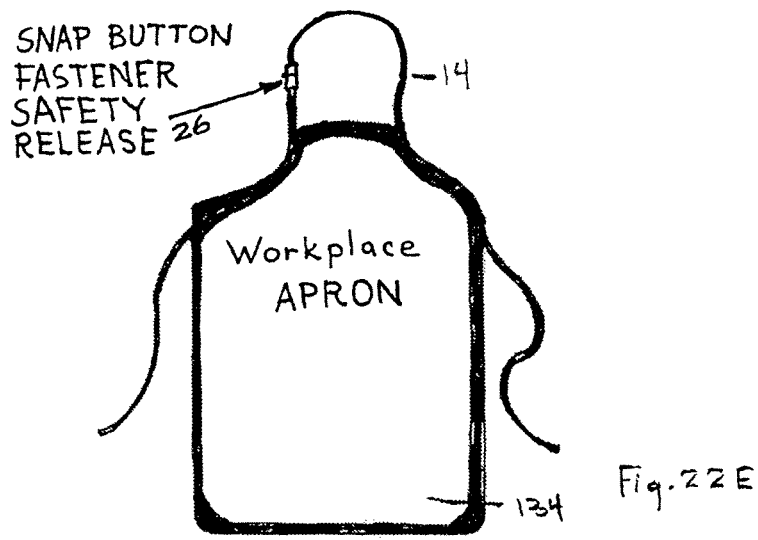
Figure 22F:
Figure 22G:
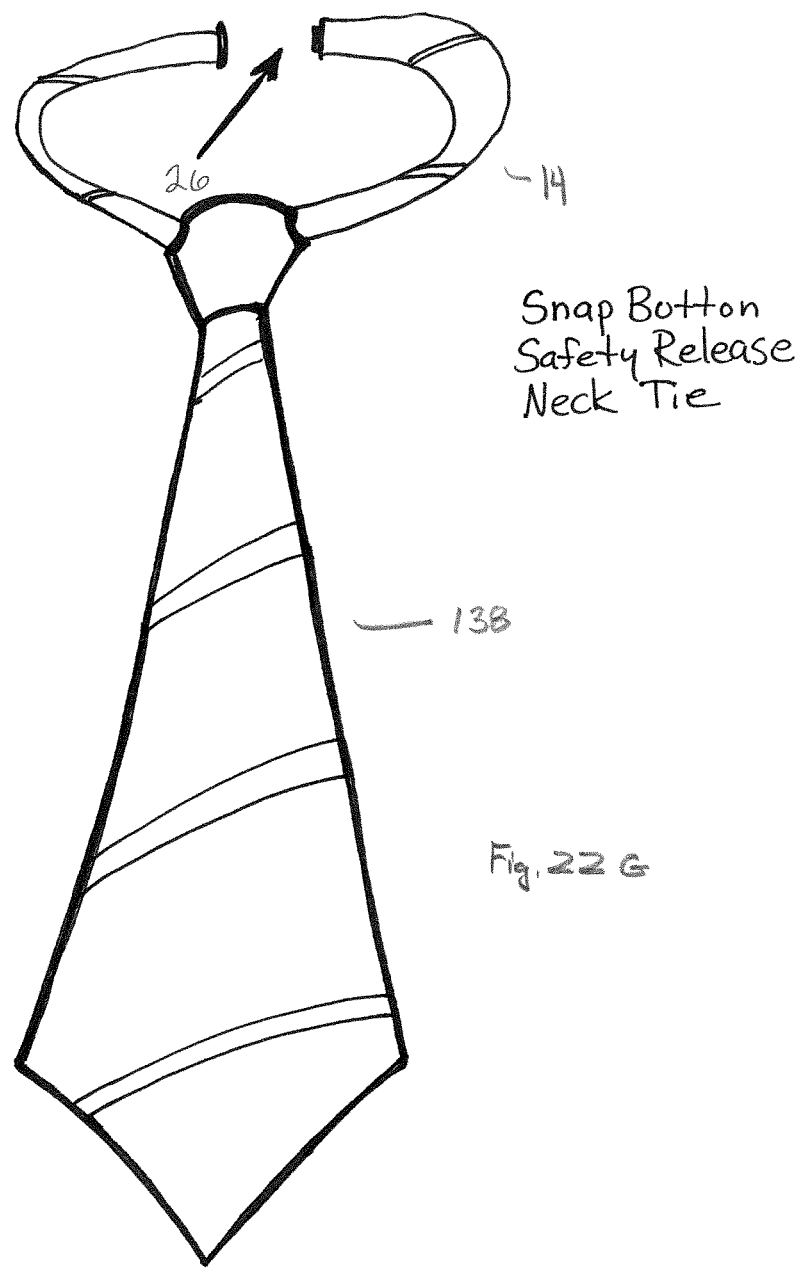
Figure 22H:
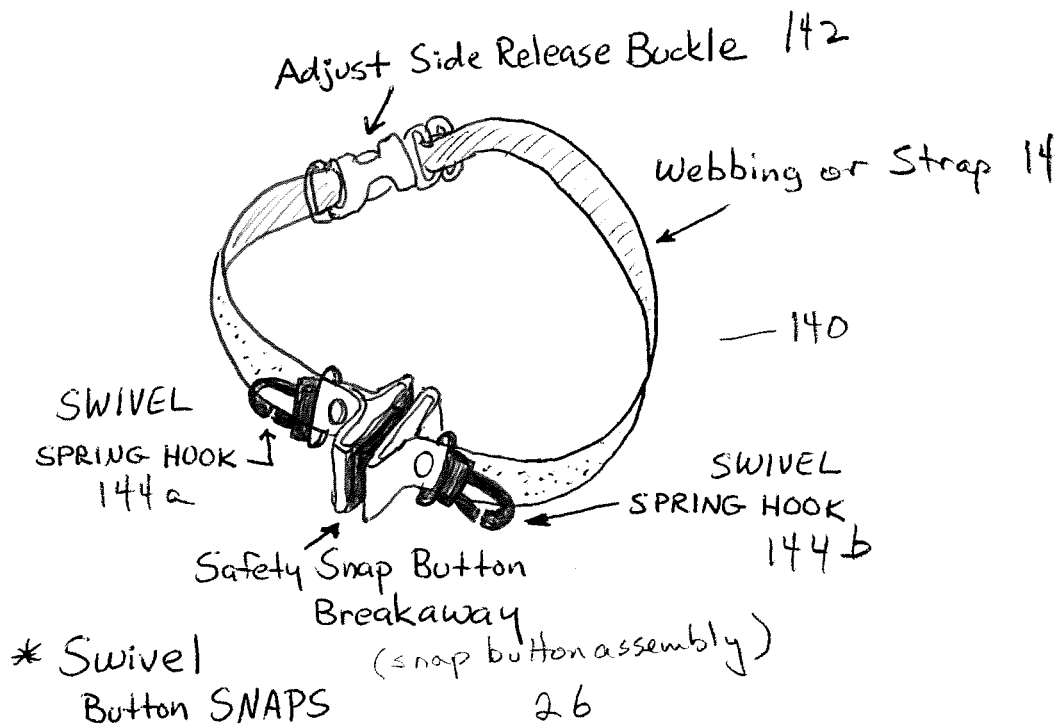
FIGS. 22H and 22I illustrate a novel pet collar using Applicant's snap button assembly.
Figure 22I:
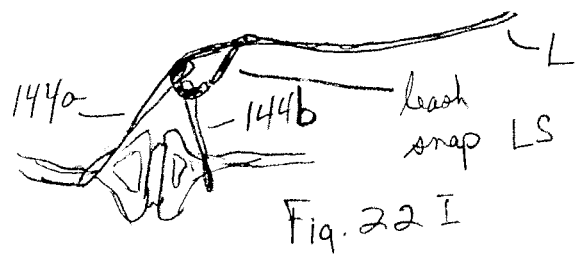

FIGS. 21 and 21A illustrate the use of Applicant's lanyard or strap with the snap assembly safety release in any of its various forms used in at least one or more places on the strap, here, 26 in the body of the strap providing for a continuous strap (no ends). It is noted that in the embodiment illustrated for use with a knife 122, and it is seen that the strap is continuous, rather than non-continuous. Nonetheless, at least one or more snap assemblies may be used for safety release. Knife 122 is seen to have a handle 122a and a blade 122b. A hole 122c may be provided in the blade or the handle or any other location for entrainment of the continuous strap or a clip or ring 124 may be used, which in turn engages strap 14.

The FIG. 22 series A, B, C, D, E, F, G, and H all illustrate various workpieces that may be used with Applicant's snap button assembly, including a strap. FIG. 22A illustrates a bib ("Baby Matthew") 126; FIG. 22B eyewear 128; FIG. 22C ID card or badge 130; FIG. 22D whistle 132; FIG. 22E apron 134; FIG. 22F necklace 136; FIG. 22G necktie 138; and FIG. 22H a pet collar 140.

Special note is made of pet collar 140, as it has unique function and structural attributes, in part due to the inventor's special love for his pets, including his several dogs. Inventor has found that traditional pet collars can become tangled in rigid objects, for example branches of a tree. Snap assembly 26 is part of a continuous strap 14 (no workpiece) which may, optionally, have a traditional adjustable buckle 142 (for adjusting strap size to pet's neck), and a pair of swivel spring hooks 144a/b (or D-rings) for bringing together and hooking to a leash L (FIG. 22I), thereby bypassing snap button assembly when walking the pet. Thus, walking the pet will not cause tension across the snap button assembly. Of course, one could use only one swivel hook or D-ring and thus have a "break-away" option to help prevent inadvertently "choking" the pet.

Hereinabove are disclosed a number of combinations and possibilities for use of Applicant's snap button assembly as part of a strap or lanyard for engaging a workpiece. The snap button assembly includes at least a male and a female portion. These may be attached directly to the straps. Either or both of the portions of the snap button assembly can be attached directly to a ring 62 (see, for example, FIG. 8A), which ring 62 can be attached to a hook or a clip 42 to attach to a workpiece. In another embodiment, ring 62 can attach to strap 14, which itself can be attached to a workpiece.

Turning to the FIG. 18 series of illustrations, either or both male or female can directly attach to swivel assembly 100, which in turn can be attached to a hook or clip 42. Further, ferrule 108 can be used to attach via swedging strap portions 15a/15b to the other of the male or female portion.

Figure 24:
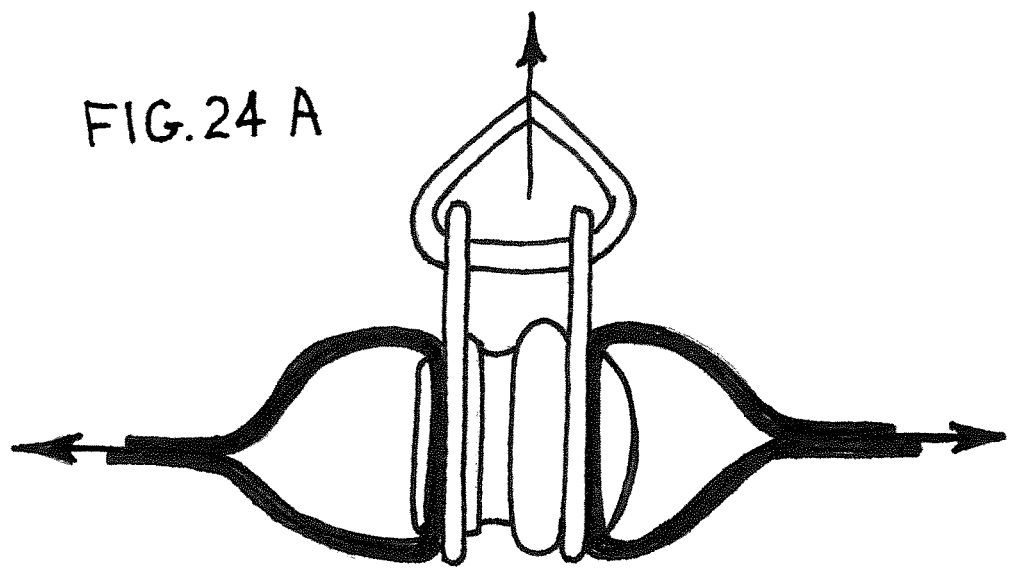
FIG. 24 is an alternate embodiment of the post and plate assembly.
Figure 24:
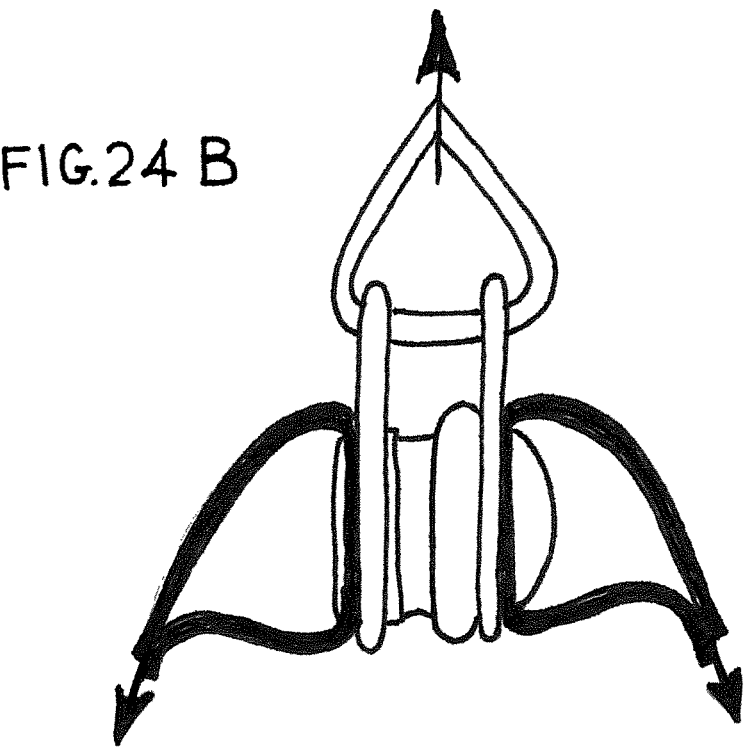

FIGS. 24, 24A, and 24B illustrate an alternate preferred embodiment of applicant's strap with a snap button assembly, here, a collar 140, such as a pet collar. Collar 140 typically includes a flexible strap 14 similar to those set forth herein above, and may also include a standard buckle such as a slide engagable buckle 142. Strap may be continuous, that is, the ends of the strap may be joined with a snap button assembly, here including, additionally a pivoting plate assembly 150 which is designed to engage a leash snap and a leash. Pivoting plate assembly 150 allows swiveling and rotation about the snap button assembly so that when the leash drops down or pulls up, a first plate 152 and a second plate 154 can pivot with respect to the snap button assembly. More specifically, it is seen that both plates 152/154 are similarly constructed, have a first hole 151 and a second hole 153. First hole 151 is entrained about one of the male or the female subassemblies so they can pivot rotationally about a pin or post 162 thereof. Second hole 153 of each of the two plates can be aligned and then leash snap LS can be slipped through both of them such that when the collar is pulled on the leash, each plate will engage each one of the two male/female portion subassemblies. This will align the forces, whereas if only a single plate were engaging the leash, then the likelihood of a separating force between male and female portions increases. In other words, with the use of pivoting plate assembly 150 in conjunction with leash snap LS and leash L there is less likelihood that there will be separation at the snap button assemblies.

However, whereas a separation force of between about 4-9 in one range or about 5-7 pounds in another range, directly along a common axis through the two assemblies can achieve separation, when leash snap and pivoting plate assembly 150 is used the likelihood of an axially alignment of separation force is less likely because a pull on the leash creates a situation in FIG. 24B, rather than the situation illustrated in FIG. 24A.

The male and female portions used are the same structurally and functionally as those in earlier embodiments with the exception of a spacer 166 (such as a nut) engaged to a post 162. Spacer 166 will typically have a diameter of less than the diameter of first hole 151 and will have a thickness greater than the thickness of plate 152/154 such that it can rotate as illustrated.

FIG. 24 illustrates a D-ring assembly 182, which comprises a D ring 183, which is another preferred embodiment, but which may also, in one embodiment, and a clamp 184 with hole 151 (allowing pivoting) or a solid body (no pivot of D-ring) be utilized with a spacer. Thus, assembly is the functional equivalent of pivoting plate assembly 150, with D-ring 184 defining hole 153 for receiving a leash, for example. That is, a pair of D-ring assemblies, one on the male portion and one on the female portion may be used rather than the plates of the pivoting plate assembly 150, such as seen in FIG. 23C. However, a D-ring may catch on to a projecting member, like a branch, and therefore inadvertently pull on the collar, yet a D-ring or rather a pair of D-rings may be used with holes as indicated in FIG. 24.

FIGS. 25A-25D illustrate the use of a breakaway glove holder 170. In the breakaway glove holder, snap button assembly 22 is used between a clamp/clip 172 or tie wrap 174 that will grip or hold gloves or other articles and a snap clip 42 (with, optionally, swivel assembly 100) to engage, for example, a belt loop. In one embodiment, the snap clip is a snap clip without a rotatable assembly. In any embodiment, the snap clip may engage one of the male or female portions of the snap button assembly and the glove gripping means 172/174 the other. The glove gripping means may be simply a strap or tie wrap 174 (FIG. 25A) or as in FIGS. 25B and 25C, spring loaded clamp/clip 42. In one embodiment, the snap clip may attach to a belt loop on the clothing of the user.

Figure 26A:
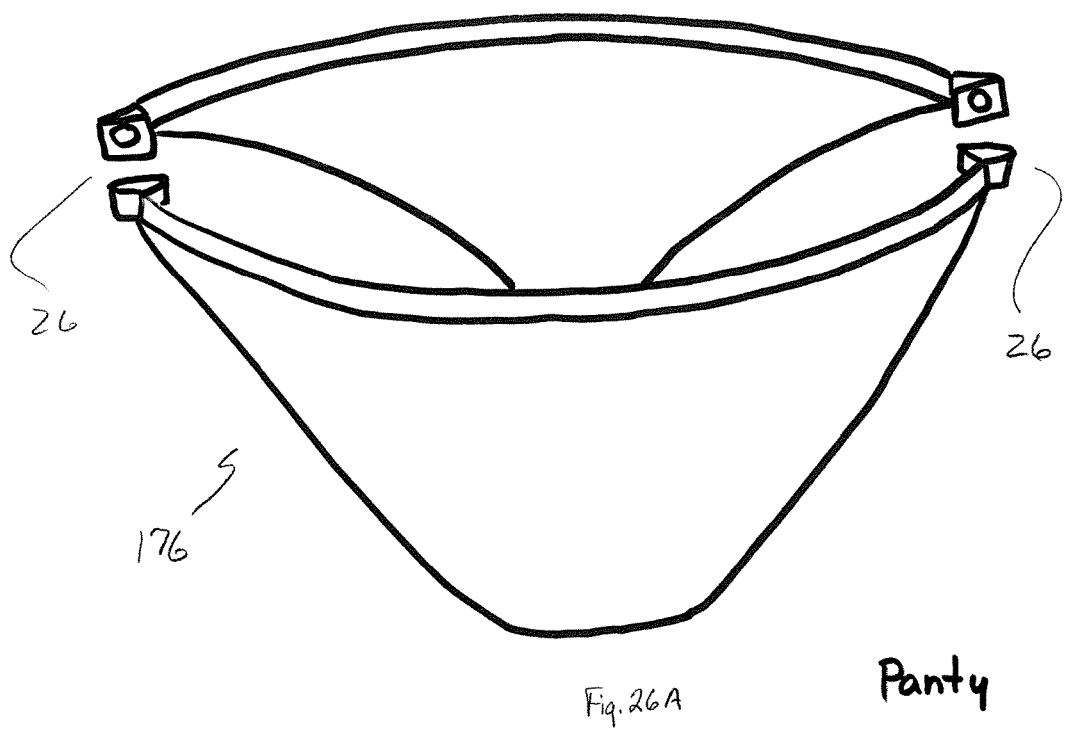
FIGS. 26A and 26B illustrate use of a snap button assembly on underwear.
Figure 26B:
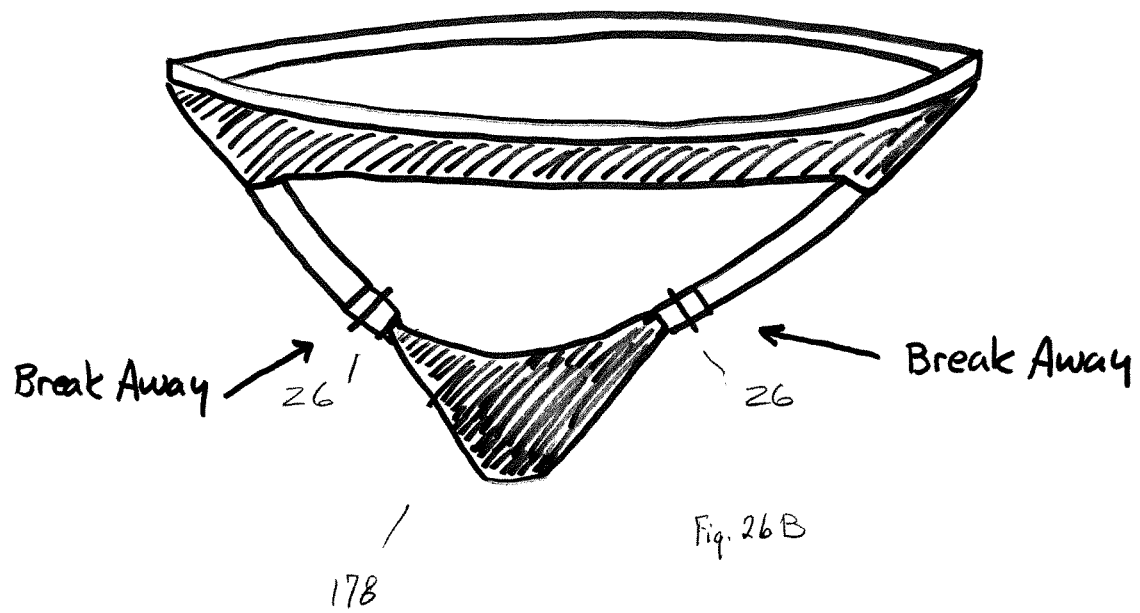

FIGS. 26A and 26B illustrate the use of snap button assembly 26 as part of a continuous "strap" (flexible member) on clothing, here, on undergarments, panty 176 (FIG. 26A), and athletic supporter 178 (FIG. 26B). Here, the snap button assemblies are engaged to the other parts of the clothing through the use of V-straps portions 15a/15b similar to those seen in earlier FIGS. 1 and 5, for example, or any other suitable arrangement. There may be one or more snap button assemblies on the clothing and they may be near the crotch area, so they may "break away" with the application of a tensile force.

In illustrations set forth in the Series 25 and 26 figures, it is seen that there may be safe release along a common axis of rotation between the male and female portions when they are coupled, when there is tension applied along that axis of rotation.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. A device for engaging a pet, the device comprising:
 a strap having a first and a second end, each end configured to form a facing section;
 a first assembly comprising a circular male portion and a rotatable pivot plate with a leash hole and a second assembly comprising a female portion and a rotatable pivot plate with a leash hole, the male and female portions for releasable engagement with one another and one of the first and second assemblies engaging one facing section of the strap and the other of the first and second assemblies engaging the other facing section so as to lay in a common plane when releasably joined, the first and second assemblies rotatable, one with respect to the other, about a common axis of rotation.

2. The device of claim 1, further including a leash with a leash snap for engaging the leash holes of the pivot plates when the two assemblies are releasably engaged.

3. The device of claim 1, wherein the strap includes a buckle between the two ends.

4. The device of claim 3, wherein the buckle is adjustable.

5. The device of claim 1, wherein the device further includes a leash.

6. The device of claim 1, wherein the first and second assemblies comprise a snap button assembly.

7. A device for engaging a pet, the device comprising:
 a strap having a first and a second end, each end configured to form a facing section;
 a first assembly comprising a circular male portion and a rotatable pivot plate with a leash hole and a second assembly comprising a female portion and a rotatable pivot plate with a leash hole, the male and female portions for releasable engagement with one another and one of the first and second assemblies engaging one facing section of the strap and the other of the first and second assemblies engaging the other facing section so as to lay in a common plane when releasably joined, the first and second assemblies rotatable, one with respect to the other, about a common axis of rotation;
 wherein one of the ends also includes a hook for engaging a leash; and
 wherein the other of the ends also includes a hook for engaging a leash;
 wherein the strap-includes a buckle between the two ends;
 wherein the buckle is adjustable; and
 wherein the device further includes a leash.

8. The device of claim 7, wherein the first and second assemblies comprise a snap button assembly.

9. A device for engaging a pet, the device comprising:
 a strap having a first and a second end, each end configured to form a facing section;
 a first assembly comprising a circular male portion and a rotatable pivot plate with a leash hole and a second assembly comprising a female portion and a rotatable pivot plate with a leash hole, the male and female portions for releasable engagement with one another and one of the first and second assemblies engaging one facing section of the strap and the other of the first and second assemblies engaging the other facing section so as to lay in a common plane when releasably joined, the first and second assemblies rotatable, one with respect to the other, about a common axis of rotation; and
 further including a leash with a leash snap for engaging the leash hole of the pivot plates when the two assemblies are releasably engaged;
 wherein the strap includes a buckle between the two ends.

10. The device of claim 9, wherein the first and second assemblies comprise a snap button assembly.

* * * * *